United States Patent [19]

Otto et al.

[11] Patent Number: 4,985,983
[45] Date of Patent: Jan. 22, 1991

[54] SHEET WORKING MACHINE WITH TOOL MAGAZINE

[75] Inventors: Gerhard Otto; Walter Tamaschke, both of Alfeld, Fed. Rep. of Germany

[73] Assignee: C. Behrens AG, Alfeld, Fed. Rep. of Germany

[21] Appl. No.: 143,583

[22] Filed: Jan. 13, 1988

[30] Foreign Application Priority Data

Jan. 23, 1987 [DE] Fed. Rep. of Germany ....... 3701858

[51] Int. Cl.⁵ ............................................ B23Q 3/155
[52] U.S. Cl. ...................................... 29/568; 72/446; 83/563
[58] Field of Search .................. 29/568, 26 A, 563; 72/446; 83/563

[56] References Cited

U.S. PATENT DOCUMENTS

| | | | |
|---|---|---|---|
| 3,816,904 | 6/1974 | Herb | 29/568 |
| 4,103,414 | 8/1978 | Herb et al. | 29/568 |
| 4,190,947 | 3/1980 | Sato et al. | 29/568 |
| 4,196,506 | 4/1980 | Reed | 29/568 |
| 4,547,955 | 10/1985 | Shiomi et al. | 29/568 |

Primary Examiner—Z. R. Bilinsky
Attorney, Agent, or Firm—Michael J. Striker

[57] ABSTRACT

A sheet working machine has a working station, a tool driving system which is connectable with a tool for mechanical working of plate-shaped workpieces, a chain-like rotatable tool magazine arranged for receiving a plurality of tools, at least one tool exchange device provided for withdrawing tools from the tool magazine and inserting the same in the working station and vice versa, the working station having at least two tool receiving systems formed so that for driving a tool they are selectively connectable with the tool driving system, so that one of the tool receiving systems which is not connected with the tool driving system is bringable in connection with the at least one tool exchange device arranged near the working station for performing a tool exchange, the chain-like tool magazine being guided at least in the region of the working station at a height corresponding to that of the working station.

19 Claims, 6 Drawing Sheets

SHEET WORKING MACHINE WITH TOOL MAGAZINE

BACKGROUND OF THE INVENTION

The present invention relates to a sheet working machine with a tool magazine. More particularly, it relates to such a sheet working machine which has a working station in which a tool is connectable with a tool drive, a chain-like rotatable tool magazine provided for receiving a plurality of tools, and at least one tool exchange device provided for removal of tools from the tool magazine and insertion in the working station and vice versa.

Sheet working machines of the above-mentioned type are known in different modifications. They are used especially for punching as well as other sheet cutting operations, and mainly operate with mechanically working cutting tools which are CNC-controlled. For providing effective working of sheet parts which have complicated geometry, a plurality of different tools must be utilized. Therefore, such machines usually cooperate with a tool magazine from which individual tool sets are transferred in the working station. The known machine systems can be subdivided into two groups which differ from one another in their tool exchange speed and the total tool stock available for a working.

Revolving cutting presses or similar machines provided with revolving plate-like magazines have a high tool exchange speed, since an exchange of the tool set located in the respective working station is possible by mere further rotation of the revolving plate. However, these machines possess the disadvantage of a limited tool capacity, since the revolving plate cannot be made of any big size because of spatial and weight considerations. Sheet working machines in which an individual head station cooperates with an external tool magazine have the advantage of a theoretically very large tool reservoir, since the external tool magazine can be practically of any size. However, each individual tool must be withdrawn from the magazine and transferred to the working or individual head station. Therefore, the last machine type possesses the disadvantage of a relatively low tool exchange speed, so that the throughout obtained in these machines is limited. In connection with this it is known to assemble several individual stations in one machine which, however, has a very expensive construction especially with respect to the punch drive devices.

SUMMARY OF THE INVENTION

Accordingly, it is an object of the present invention to provide a sheet working machine, in which in a simple manner a high tool exchange speed is provided and at the same time a considerably larger tool stock for a mechanical working is available.

In keeping with these objects and with others which will become apparent hereinafter, one feature of the present invention resides, briefly stated, in a sheet working machine in which a working station includes at least two tool receiving systems which for driving the tool are selectively connectable with a tool driving system, at least one tool receiving system which is not connected with the tool driving system is bringable in connection with at least one tool exchange device arranged in the vicinity of the working station for the purpose of the tool exchange, and a chain-like tool magazine is guided at least in the region of the working station on a respective height.

The important feature of the invention is that the working station has two or more tool receiving systems which are selectively coupled with the tool driving system. Each tool working system is designed for receiving a complete tool set or a respective tool, and from this plurality of the tool receiving systems only one tool receiving system is located in direct working condition with respect to a workpiece to be worked. This system of two or more tool receiving systems forms a first tool magazine with the characteristic that an exchange of the tool set respectively connected with the tool driving system can be performed very fast by displacement or rotation of this first tool magazine and in particular during such a time period which is comparable with a tool exchange time in revolving plates. This first tool system cooperates with a further chain-like rotatably driven tool magazine which contains a plurality of complete tool sets. With the aid of a tool exchange device, any tool sets are withdrawn from the chain-like tool magazine and transferred into one of the above-mentioned tool receiving systems. It is of especial advantage that this exchange of the tool sets is performed between the chain-like tool magazine and the tool receiving system, while the respective one tool set coupled with the tool driving system is located in working condition. Because of the tool exchange between the above-mentioned tool magazines, continuous running of working process it not affected. Because of the chain-like construction of the above-mentioned second tool magazine, it can be designed with any spatial extension and therefore can be structurally formed with consideration of a minimal volume, especially a minimal projection over the contours of the machine. Since the chain-like tool magazine is guided in the region of the working station at a height corresponding to it, the movement required for the tool exchange or exchange between the above-mentioned magazines is maintained kinematically simple and accelerated because no complicated multi-dimensional adjusting movements are needed.

When the machine is designed in accordance with the present invention it combines the advantages of the revolving cutting press characterized by a fast tool exchange with the advantages of an individual head machine with an external tool magazine providing a large tool reservoir, while avoiding the disadvantages of these types of machines.

In accordance with another feature of the present invention, at least two tool receiving systems are formed by at least one motor-drawn rectilinearly displaceable carriage, the carriage is provided with arresting devices for fixing the tool in an exactly predetermined position or is associated with such arresting devices, and the arresting devices are advantageously at least partially switchable in a motor-driven manner. The arrangement of the tool receiving systems on the rectilinearly displaceable carriage provides for an especially advantageous embodiment since the movement required for a tool exchange in the region of the tool driving system is very simple and can be performed very fast. The carriage is arrestable in exactly predetermined positions which are identified as tool exchange positions as long as the tool set located in the respective tool receiving system is not coupled with the tool driving system. Each tool exchange position can be associated with its own tool exchange device, whereby a tool exchange between the above-mentioned magazines is performed especially fast. It is also possible to arrange a tool exchange device displaceably relative to the individual tool exchange positions.

Still another feature of the present invention is that the chain-like tool magazine is arranged rotatably in a horizontal plane, and the contour of its running substantially corresponds to the contour of the base body of the machine. Such construction provides for an especially space-economical construction of the invention sheet working machine.

The chain-like tool magazine and/or the carriage can be provided with arresting devices for adjusting these structural elements in definite positions. The tool magazine can be formed by individual articulately connected chain links, with a tool holder reciprocably displaceable on each chain link in direction to and from the working station, while each tool holder can carry handling devices for engaging at least one tool, and the drive of the tool holders and especially their handling devices is performed through the tool exchange devices. The chain-like tool magazine designed in accordance with these features is advantageous since all handling devices required for engagement of a tool or tool set, namely the tool supports and handling devices arranged on each chain link, are components of the chain-like tool magazine.

In accordance with further features of the present invention, the tool exchange devices are stationary, the tool magazine is guided on the tool exchange device at a small distance, and the tool support can be coupled with the tool exchange devices by moving the tool magazine along its circular path. The tool exchange devices are provided each with a displacement drive for producing a rectilinear movement of the tool support on the working station in a reciprocating manner, and also with a rotary drive for performing locking functions through the handling devices. In this construction the tool support associated with each chain link serves simultaneously as a driving element for the handling devices. The driving movements perform a rectilinear displacement movement and a rotary movement so that two different coupling processes are accomplished. A coupling between the tool support and the tool exchange device with respect to the rectilinear displacement is performed by movement of the chain-like tool magazine in a circumferential direction and subsequent arresting in a predetermined position. In the region of the working station of the sheet working machine the above-mentioned carriage or carriages, the chain-like tool magazine, and the tool exchange device or devices are arranged immediately near one another.

The handling devices are formed as a pair of pins associated with the tool, and one pin is arranged rotatably and the other pin non-rotatably on the tool support. The rotatable pin can be coupled with the rotary drive of the tool exchange devices, and the tools to be handled are provided with openings for receiving the pins and devices for arresting the rotatable pin against an unintentional pulling out of the opening. In the region of the tools to be handled, two openings are arranged for receiving the above-mentioned pins. One opening performs only a supporting function, while the other opening which is designed for receiving the rotatable pin performs both a supporting function and an arresting function. This arresting by turning of the rotatable pin can be achieved in a form-locking manner by a respective design of the end region of the pin in connection with a blocking body arranged in the above-mentioned opening.

The tools are arrested in the tool receiving systems of the carriage from an unintentional removal. Different types of arresting devices can be used in this connection. For performing a tool exchange, especially for transferring the tools or the tool sets from the carriage to the chain-like tool magazine, these arresting devices are released. In connection with a further feature of the present invention, the devices for fixation of the tool are actuatable by movement of the carriage along the associated guiding rails. The release of the arresting devices can be performed by a control movement by moving the carriage along the associated guiding rails. Therefore, additional motor drives for releasing of the arresting function are unnecessary.

The tool magazine in the region of the working station and the tool exchange devices is guided parallel to the carriages. The carriages are arrestable in exactly predetermined positions, and at least one tool receiving system of the carriage is opposite to one of the positions of the tool exchange devices with a distance therefrom. Such construction provides for many possibilities for arrangement of the arresting position of the carriage relative to the chain-like tool magazine, and thereby the arrangement of the tool exchange devices which are located opposite to the respective positions of the carriage.

The tool with which the inventive machine operates can be a punching tool which is composed of an upper and a lower tool held in separate tool receiving systems. The separate tool receiving systems are arranged in independently rectilinearly movable carriages, at least upper and at least lower tool exchange device is arranged in the working station, and the chain-like magazine is subdivided into an upper and a lower chain train which are drivable preferably independently from one another, and have chain links on which upper and lower tool supports are movable in direction to the working station or from the latter. In this construction when the inventive machine is a punching machine, the upper and lower tools are provided with separate independent carriages and chain-like magazine movable independently of one another. This provides for a high flexibility of the tool exchange, since corresponding upper and lower tool supports are movable independently of one another.

In accordance with a further feature of the present invention the tool in the working station is connected in its coupled position with the tool drive system, with a drive system for rotating about its longitudinal axis. The connection between this drive system and the tool is coupleable, and the drive system is mounted on the base body of the machine. In this construction the tool receiving devices of the punching machine are adjusted to such embodiment in which the tools are fixable about their longitudinal axes in an exactly predetermined angular position relative to the workpiece. During the displacement of the tool receiving systems, especially the carriages which support them, the drive system which activates the rotary movement about the longitudinal axis of the tool is uncoupled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
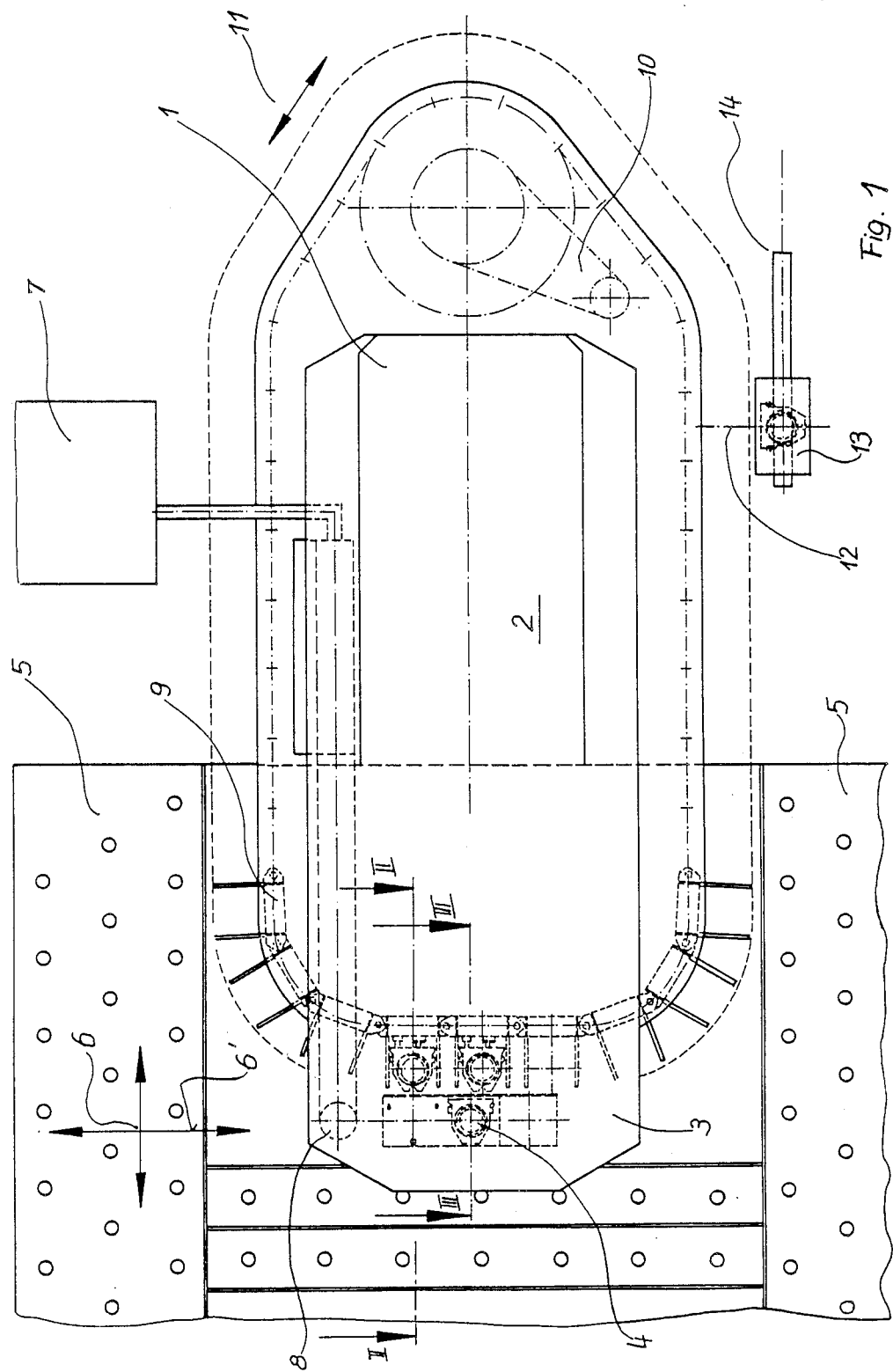
FIG. 1 is a plan view of main components of a sheet working machine in accordance with the present invention.

A sheet working machine shown in FIG. 1 is identified with reference numeral 1. Its base body 2 has a C-shaped design and supports a punching station 4 on its open end region 3. The sheet working machine 1 cooperates with a known coordinate table 5. The sheet pieces to be worked are transported by the coordinate table in direction of the arrow 6 through the punching station. In the punching station whose construction will be described in detail later on, the mechanical treatment of the workpiece is performed by means of a tool set which includes an upper tool located above the plane of the sheet piece and a lower tool located under the plane of the sheet piece.

Reference numeral 7 identifies a laser generator and reference numeral 8 identifies a thermal cutting device associated with it. They complete the mechanical working capabilities in the punching station. The thermal cutting device 8 is located in the vicinity of the punching station 4.

Reference numeral 9 identifies a chain magazine which is composed of two chain trains arranged one above the other and carries peripherally a plurality of complete tool sets composed of an upper tool and a lower tool. The chain magazine 9 passes by the punching station 4 for the purpose of a tool exchange and is in working connection with a drive system 10. The drive system 10 can be formed as any motor-transmission unit, by which the chain magazine is driven in direction of the arrow 11 with a suitable speed.

Reference numeral 12 identifies a station which is located in the region of the guidance of the chain magazine 9 and provided for withdrawal or insertion of the tool sets in the chain magazine 9. The station 12 serves for continuous automated transfer of the tool sets from the chain magazine 9 to a transporting carriage 13 which is movable along a guiding rail 14 in direction toward a not shown tool storage in a motor-driven fashion. The transporting carriage 13 is provided with suitable handling devices associated with the tool sets. These devices correspond to those devices which are used during the tool exchange in the punching station 4. In connection with the tool storage, which is provided with respective handling devices for automatic operation, a theoretically unlimitedly increasable tool reservoir is available for the working process of a workpiece.

In accordance with the invention, the horizontal guide of the chain magazine 9 corresponds to the construction of the base body 2 so that the structural volumes or the consumption of the standing surfaces in the sheet working machine are increased only insignificantly. The tool sets held in the chain magazine can be transferred in the punching station 4 in a slot-like punching block which is movable in horizontal direction parallel to the arrow 6'. It has at least two receiving devices for respective complete tool set. One of these receiving devices can be in a position in which it is in working condition and therefore cooperates with the machine plunger, while the other receiving device can be available for a tool exchange. It is important that the exchange of the tool set located in a receiving device can be performed, while simultaneously respective other tool set is located in working condition. The construction of the punching station as well as the components which take part in the tool exchange are shown in FIGS. 2-5, and the parts shown in FIG. 1 has the same reference numerals in these Figures.

Figure 2:
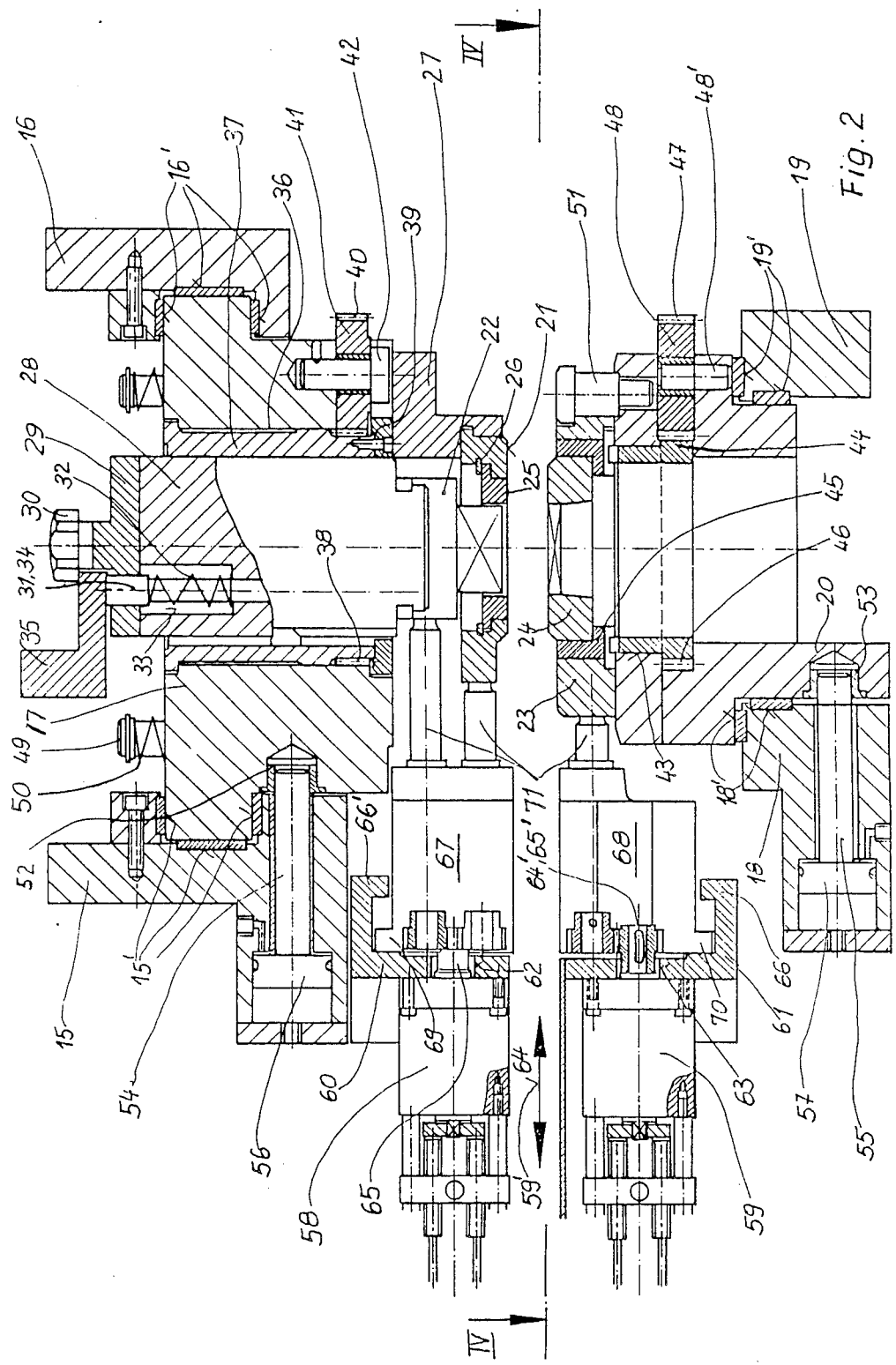
FIG. 2 is a vertical section of the sheet working machine in FIG. 1, taken along the plane II—II.

Guiding rails mounted on the base body 2 are identified in FIG. 2 with reference numerals 15 and 16. They extend transversely to the base body 2 or in other words parallel to the arrow 6 in FIG. 1. These guiding rails 15 and 16 have respectively guiding surfaces 15' and 16' with which an upper punching block 17 is guided. The construction of the sliding surfaces can be of any type. They can be formed as pure sliding surfaces, also they can provided with respective roller bearings. The punching block 17 is movable or displaceable rectilinearly and perpendicularly to the plane of the drawing of FIG. 2.

Similarly, guiding rails 18 and 19 are provided for guiding a lower punching block 20. The guidance is performed on both guiding rails 18 and 19 over respective guiding surfaces 18' and 19' which extend parallel to the guiding surfaces 15' and 16'. Therefore, both punching blocks are displaceable on guides which extend parallel to each other.

The punching blocks 17 and 20 serve for receiving the respective upper and lower tool a complete tool set. The upper tool which takes place in a tool exchange includes a stripper 21 and a punch 22, while the lower tool includes a die shoe 23 with a die 24 inserted in it. Reference numeral 25 identified a stripper ring which is arrested via a flange ring in a form-locking manner between a ring surface of the stripper and a safety ring 26. The stripper is inserted in a known manner in a stripper shoe 27 so that its horizontal withdrawal from the stripper shoe 27 is possible.

Reference numeral 28 identifies a punch holder which is associated with the punch 22. Its upper closure is formed by a punch holder cover 29. A holding head 30 is mounted on the cover 29 which is immediately coupleable in a known manner with the machine plunger of the sheet working machine for performing a punching process.

Reference numeral 31 in FIG. 2 identifies an arresting pin which serves for fixing the punch 22 relative to the punch holder 28. The punch 22 is provided for this purpose in its upper region with a not shown receptable, for example, an opening, in which the arresting pin 31 engages. The arresting pin is supported by means of a spring 32 in an opening 33 of the punch holder. The spring 32 abuts at its one end against the punch holder 28 and its another end against the head part 34 of the arresting pin. The head part 34 extends through the punch holder cover 29 and lies at the lower side of a punch holder strip 35 which engages the holding head 30 and arranged on the base body 2 of the sheet working machine. The punch holder strip 35 extends parallel to the guiding rail 15 and 16.

The punch holder 28 is arranged inside a bushing 37 which is rotatably received in an opening 36 of the punch block 17. Rotation of the punch holder 28 relative to the bush 37 is prevented by conventional means, for example, a groove-spring connection. The bush is provided in its upper end region with a ring flange which serves for supporting on the punching block 17, and carries at its lower end region an outer teeth 38. The lower closure of the bush 37 is formed by a cover 39 which is connected via a screw connection with the bush 37. The teeth 38 are in engagement with teeth 40 of an intermediate wheel 41. The latter is rotatably supported in the punching block 17 on an axle 42 which extends parallel to the axle of the punch holder 28. The intermediate wheel 41 is in working connection with a drive which will be explained hereinbelow.

A lower punching block 20 is provided with an opening 43. A bush 44 is rotatably inserted in the opening 43 and is in a form-locking engagement with a receiving ring 45. The die 24 is non-rotatably inserted in the receiving ring 45. The receiving ring 45 is rotatably supported relative to the die shoe 23. The bush 44 carries outer teeth 46 which are provided on its lower region and engage with teeth 47 of an intermediate wheel 48. The intermediate wheel 48 is rotatably supported in the lower punching block 20 on an axle 48' which extends parallel to the axis of the die 24. It is also in operative connection with a drive which will be described hereinbelow.

Under the action of the rotary movement performed in the intermediate wheel 41, 48, the die 24, the stripper ring 25, and the punch 22 can be rotated.

Reference numeral 49 identifies arresting pins on which the stripper shoe 27 is mounted and which in turn are supported via spring elements 50 on the upper surface of the punching block 17. The description of these known stripper pins is dispensed with.

Reference numeral 51 identifies a fixing pin which is in a form-locking engagement with the matrix shoe 23 and thereby serves for its arresting.

FIG. 2 shows the punching blocks 17 and 20 in a position which can be identified as tool exchange station. As mentioned hereinabove, the punching blocks 17 and 20 contain two receptacles for tool sets arranged near one another which will be considered later on. The punching blocks 17 and 20 are provided laterally with arresting bushes 52 and 53 which are inserted in respective openings. The arresting bushes 52 and 53 cooperate with piston rods 54 and 55 of two arresting cylinder-piston units 56 and 57. Their pistons are actuated with pressure medium at both sides. The arresting cylinder-piston units 56 and 57 are mounted on the guiding rails 15 and 18 and serve for fixing the punching blocks 17 and 20 in the tool exchange station shown in FIG. 2.

Reference numerals 58 and 59 identify an upper and a lower tool exchange device. The tool exchange devices whose construction will be described later on, are supported on the base body 2 of the sheet working machine displaceably in direction of the arrow 59'. They end at the end facing toward the tool side, in plates 60 and 61 which are provided with openings 62 and 63 for positioning of a shaft 65' which supports a pinion 64'. The plate 60 moreover is provided on its upper end with a portion which extends in direction of the tool and ends in a receiving part 66'. The plate 61 is formed similarly and ends at its end facing the tool also in a receiving part 66. The angular receiving parts 66 and 66' extend at a distance from and parallel to the planes of the plates 60 and 61.

An upper and a lower tools support are identified with reference numerals 67 and 68. At their ends facing toward the plates 60 and 61, the supports are respectively provided with cams 69 and 70 which are bringable in engagement with the respective receiving parts 66' and 66. The tool supports 67 and 68 have a limiting surface facing toward the plates 60 and 61 and merging into the respective limiting surface of the cams 69 and 70 in a flush fashion.

The tool supports 67 and 68 are supported on the links of the respective upper or lower chain magazine and slidably in direction of the arrow 59'. The tool supports carry pins 71 at their end which faces toward the tool to be handled. The pins are formed for direct engagement in the respective tool, namely with the stripper 21 with the punch 22 and with the die shoe 23 including the die 24. The pins 71 are supported on the tool supports 67 and 68 in a partially non-rotatable and partially rotatable manner. A rotary movement is provided via the respective pinion 64 of the tool exchange device 59.

It is important that by displacement of the plates 60 and 61 of the tool exchange devices 58 and 59, the tool supports 67 and 68 can be displaced in direction to the tool to be exchanged. The displacement movement in direction toward the tool is performed by the abutment of the limiting surfaces of the plates 60 and 61 which face toward the tool, against the facing surfaces of the tool supports 67 and 68. In contrast, the oppositely directed displacement movement of the tool supports 67 and 68 is achieved by the oppositely directed displacement of the plates 60 and 61. The receiving parts 65 and 66 are brought in engagement with the cams 69 and 70 and in this manner the tool supports 67 and 68 are withdrawn. The drive devices of the tool exchange device 58 and 59 are actuated independently of one another. It can be recognized from the above described showing in connection with FIG. 2 that the form-locking engagement between the receiving ring 45 and the bush 44 must be prerformed so that a displacement of the die shoe 23 with the receiving ring 45 and die 24 in direction of the arrow 59' is possible.

Figure 3:
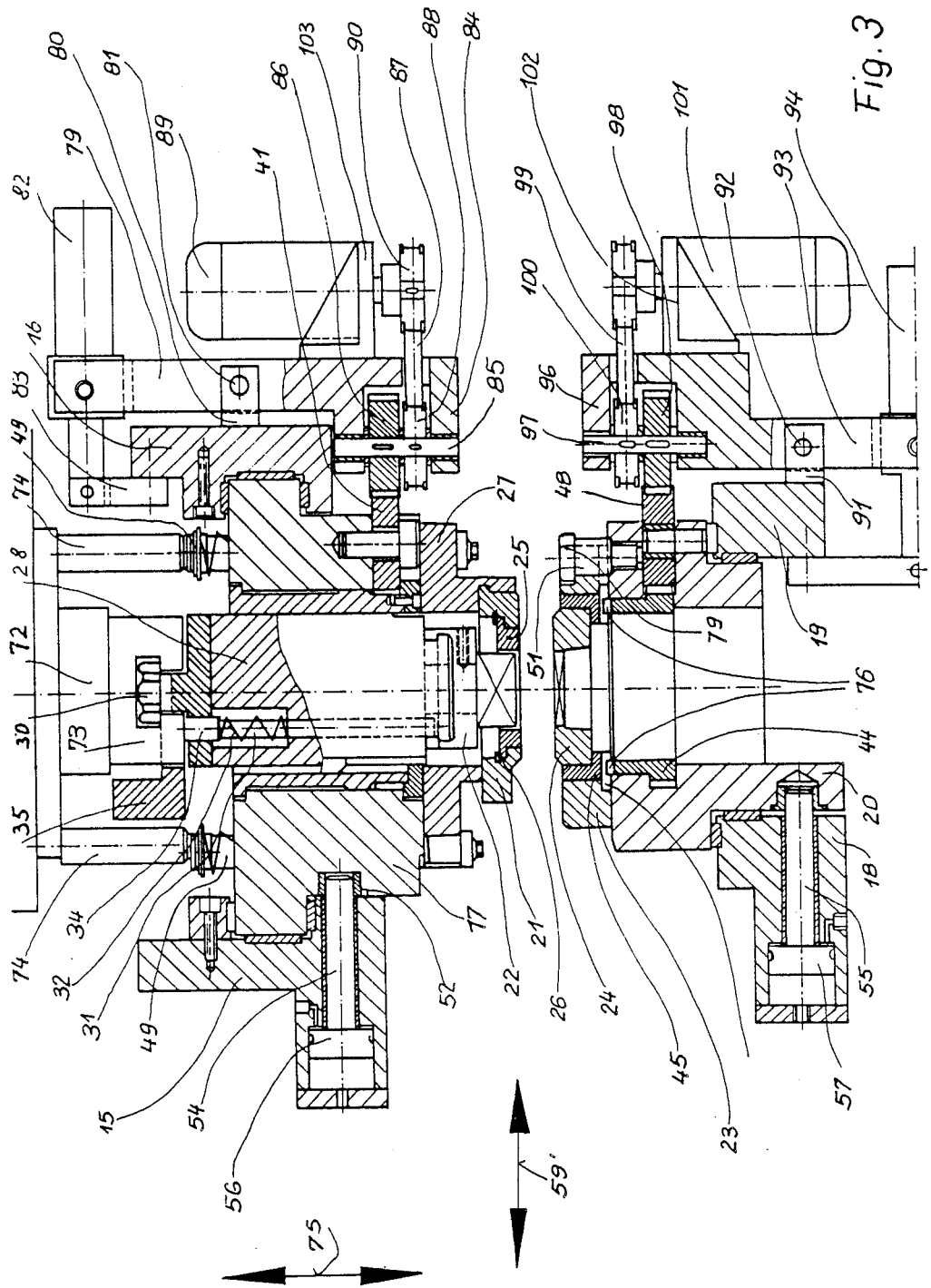
FIG. 3 is a vertical section of the sheet working machine of FIG. 1, taken along a plane III—III.

FIG. 3 shows the punching blocks 17 and 20 in the punching station 4 of the sheet working machine. In this case holding head 30 is form-lockingly received in an adapter part 73 which is mounted on the machine plunger 72. The adapter part 73 abuts simultaneously against the outer surface of the head part 34 of the arresting pin 31. An actuating pin is identified with reference numeral 74, and its vertical movement in direction of the arrow 75 is connected with the movement of the machine plunger 72. The actuation pin 74 extends parallel to the stripper pin 49 and lies on its upper side. A respective movement of the stripper shoe 27 and thereby the stripper 21 is performed via the actuating pin 74 and the stripper pin 49 during each stroke of the machine plunger 72.

Pins 76 extend on diametrically opposite ends of the bush 44 outwardly beyond its upper limiting plane and engage in respective grooves 77 which are formed in the die shoe 23 as well as in the receiving ring 45. This insures a basic displaceability of the functional unit composed of the die shoe 23, the receiving ring 45, die 24 in direction of the arrow 59'. At the same time, a rotation-fixed connection between the bush 44 and the receiving ring 45 is produced.

It can be recognized that the displacement movement of the matrix shoe 23 formed through the fixing pin 51 in direction of the arrow 59' is limited. The die shoe 23 is provided at its end facing the fixing pin 51 with an approximately semi-spherical recess which in the position shown in FIG. 3 partially surrounds the fixing pin. Simultaneously, a partial overlap of an upper recess of the die shoe 23 is performed by the head part 79 of the fixing pin, so that a fixation of the die shoe 23 in a direction perpendicular to the arrow 59' is provided. The fixing pin 51 is screwed in the punching block 20.

The punch 22 and the stripper 21 are also mounted displaceably in direction of the arrow 59' on the punch holder 28 and the stripper shoe 27, respectively. Therefore, a removal of these parts of the upper tool or an insertion in direction of the arrow 59' is possible. An arresting with respect to an unintentional movement of these both tool components in direction of the arrow 59' can be achieved basically in any manner, for example, in a form-locking manner. In the shown example, it is performed by the arresting pin 31 which is pressed through the adapter part 73 against the force of the spring 32 in direction towards the punch 22, and thereby is brought in engagement with an opening in the upper part of the punch. For the stripper 21, no special arresting is needed since the upper part of the punch has only a very small clearance relative to the stripper ring 25.

Reference numeral 79 identifies a lever which is supported rotatably about an axle 81. The latter is mounted through a console 80 on the guiding rail 16 perpendicularly to the plane of the drawings in FIG. 3. The rotary movement is performed by means of a cylinder-piston unit 82, whose piston is articulately mounted on the lever 79 and whose piston rod is articulately mounted on an intermediate part 83 on the guiding rail 16. The cylinder-piston unit 82 is acted upon with a pressure medium at its both sides.

The two-sided lever 79 carries a fork-like bearing part 84 at its end which faces away of the cylinder-piston unit 82. The bearing part 84 receives a shaft 85 which extends parallel to the lever 79. The shaft 85 carries a toothed wheel 86 with teeth which engage with the intermediate wheel 41. Simultaneously, the shaft carries a further toothed wheel 87 which is in working connection, via a toothed belt 88, with a furter toothed wheel 90 arranged on the driven shaft of a motor 89. The motor 89 in connection with the above-memtioned toothed belt transmission forms a drive system for a turning movement of the bush 37 and thereby the punch 22 in connection with the stripper ring 25. The engagement between the toothed wheel 86 and the intermediate wheel 41 can be released by actuation of the cylinder-piston unit 82 and the resulting turning movement about the axis 81, so that a displacement of the punching block 17 along the guiding rails 15 and 16 perpendicularly to the plane of the drawings of FIG. 3 is possible by the motor 89 without problems.

A further lever 93 is supported turnably perpendicularly to the plane of the drawing of FIG. 3 on the guiding rail 19 via a console 91 and an axle 92 supported by the console. The lever 93 is also formed as a two-side lever and is in operative connection on its one end with a cylinder-piston unit 94 whose piston rod is articulately connected with an intermediate part mounted on the guiding rail 19 and whose cylinder is articulately connected with the lever 93. The lever 93 carries a fork-like bearing part 96 at its end which faces away of the cylinder-piston unit 94. A shaft 97 is supported in the bearing part 96 and carries a toothed wheel 98 engaging with the intermediate wheel 48 and a further toothed wheel 100 engaging with a toothed belt 99. The toothed belt 99 is in engagement with a further toothed wheel 102 supported on the driven shaft of a motor 101. The motor 101 in connection with the above described toothed belt transmission forms a drive system for a rotary movement of the bush 44 and thereby the matrix 24. The motors 89, 101 are mounted on the levers 79 and 93 via special consoles 102, 103. For the described rotary movement of the tool, such motors are used which permit a respective fine-stepped rotary angle control. A measuring system for detecting the rotary movement of the tool and used through respective control circuit for controlling the motor is not shown in the drawings.

Figure 4:
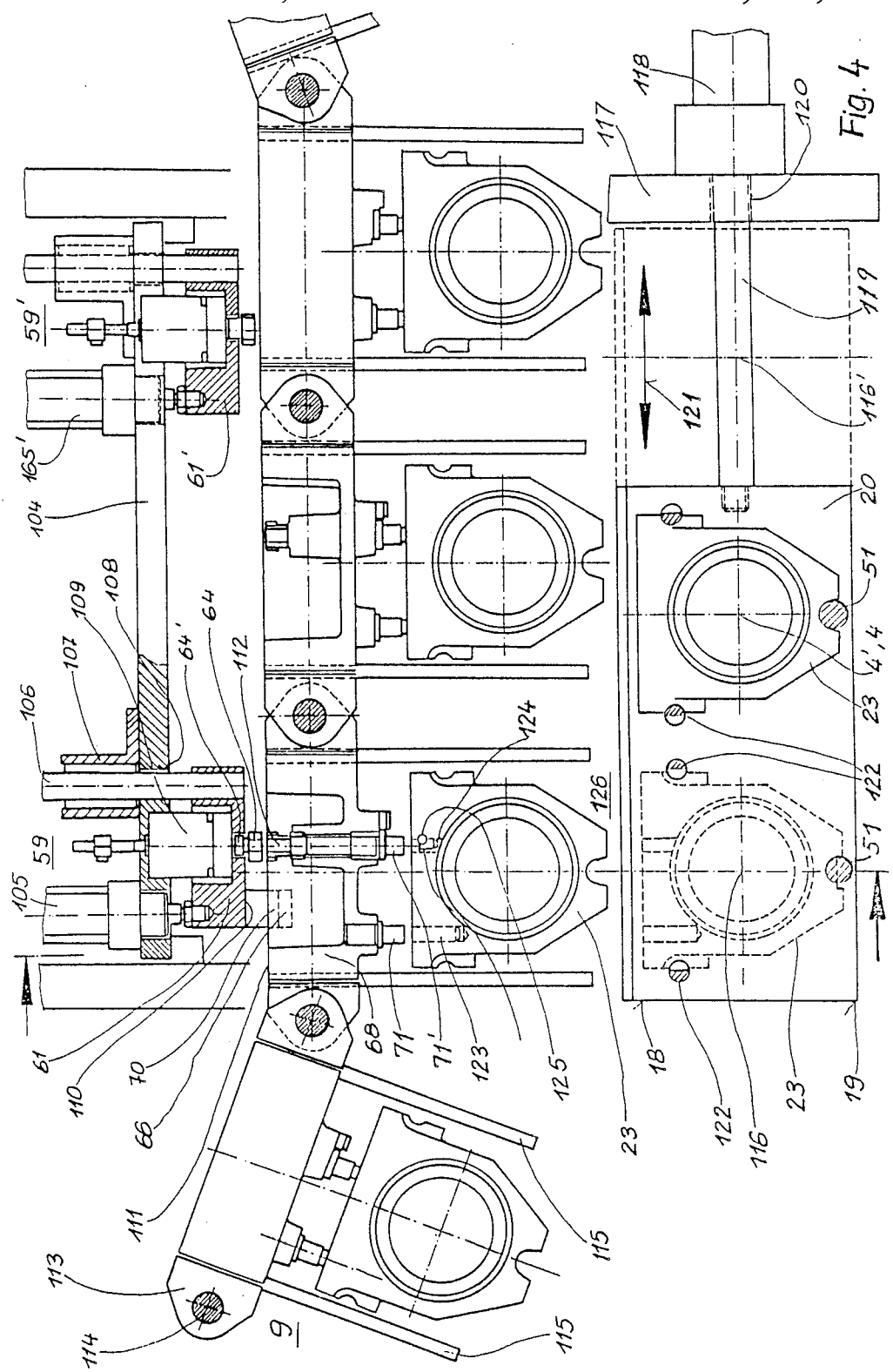
FIG. 4 is a view showing a horizontal section along a cutting plane IV—IV of FIG. 2.

An intermediate wall which is mounted on the base body 2 of the sheet working machine is identified in FIG. 4 with reference numeral 104. It serves as a supporting wall for the tool exchange devices 59. Since the lower and upper tool exchange devices have great similarity, only the lower tool exchange device will be described in detail hereinbelow together with the associated functional elements.

The tool exchange device 59 includes a cylinder-piston unit 105 with a cylinder mounted on the intermediate wall 104 and the piston mounted on the plate 61. A guiding rod 106 is slidingly supported inside a bearing cylinder 107 and an opening 108 of the intermediate wall 104. The bearing cylinder 107 is mounted on the intermediate wall 104 in a not shown manner. The guiding rod is firmly connected with the plate 61.

The plate 61 also carries a rotary cylinder-piston unit 109 forming a rotary drive. It is actuated with the pressure medium at its both sides and therefore provides for a right running and a left running. The pinion 64 is located on the driven shaft of the rotary cylinder-piston unit. As shown, a front surface 110 of the plate 61 can be brought by actuation of the cylinder-piston unit 105 to abutment against a counter surface 111. Simultaneously, the pinion 64 is brought in engagement with a toothed wheel 112 which is in connection with a pin 71' of the tool support 68. This pin 71' is supported rotatably on the tool support 68, while the other pin 71 which extends at a distance from and parallel to the pin 71', is arranged non-rotatably on the tool support 68. By actuation of the rotary cylinder-piston unit 109, a rotary movement can be transmitted to the pin 71'. Both pins 71 and 71' are located in a common horizontal plane.

Individual links of the lower chain magazine are identified with reference numeral 113. They are connected with one another by pins 114. The guidance of these chain links will be explained hereinbelow. Each chain link is associated with a pair of strips 115 which extend parallel and at a distance from one another. They serve for guiding the tool support 68.

Two tool exchange devices 59 are arranged on the intermediate wall 104. They are located at an exactly predetermined lateral distance on the same horizontal height, as will be explained hereinbelow. The chain magazine 9 is driven so that it can be stopped in exactly defined positions relative to the tool exchange devices 59.

Reference numeral 4' identifies a central point of the punching station 4, and a tool set is located directly in the punching station 4. It can be recognized that two practically identical tool receiving devices are located side-by-side in the lower punching block 20. The guiding rails 18 and 19 associated with the punching block have such a length that the tool exchange stations are arranged at both sides of the central punching station and their center points are identified with reference numerals 116 and 116'. The lateral distances from the central points 116 and 116' to the center point of the tool exchange stations corrospond to the respective lateral distance of the tool exchange devices 59 and 59'.

Arresting tools 122 are turnable about 180° and arranged at both sides of the die shoe 23 located in the puncing block 20. In one rotary position of the arresting pins, the die shoe 23 is arrested relative the punching block 20, while in another rotary position a withdrawal of the matrix shoe 23 from the punching block is possible. The arresting pins 122 can be connected in a not shown manner with the rotary drives. The form-locking engagement of these arresting pins 122 with the edge of the die shoe can be structurally performed in any manner.

Openings 123 and 125 are provided in the matrix shoe 23 and arranged at a distance from and parallel to one another. They cooperate with the pins 71 and 71'. The opening 124 is provided with a pin 125 which extends transversely to the opening and serves for form-locking engagement of the die shoe 23 through the tool exchange device 59 especially the turnable pin 71'. For this purpose, the end region of the pin 71' is formed asymmetrically, or in other words, flattened on one side and provided with a circular-segment shaped groove in the peripheral region facing away of the flattened side with a radius approximately corresponding to the radius of the pin 125. The flattening and the pin 125 have such dimensions that in one rotary position of the pin 71' it can be inserted into the opening 124 and particularly over the pin 125, while during transfer of the pin 71' to its second rotary position the pin 125 engages with the aforementioned circular segment-like groove to provide a form-locking connection between the pin 71' and the die shoe 23. Therefore, the pin 71' performs an arresting and a supporting function, while the other pin 71 performs only a supporting function.

It can be recognized that in the configuration shown in FIG. 4 the tool located in the punching station 4 can be in working condition, while simultaneously the tool held in the chain magazine 9 located in the position 126 can be supplied by means of the tool exchange device 59 to the punching block 20 and thereby reach the position shown in broken lines. It is also recognizable that an exchange of the tool set located in the punching station 4 by the tool set located in the position 23' can be performed in shortest time by displacement of the punching block 20 in the direction of the arrow 121.

Figure 5:
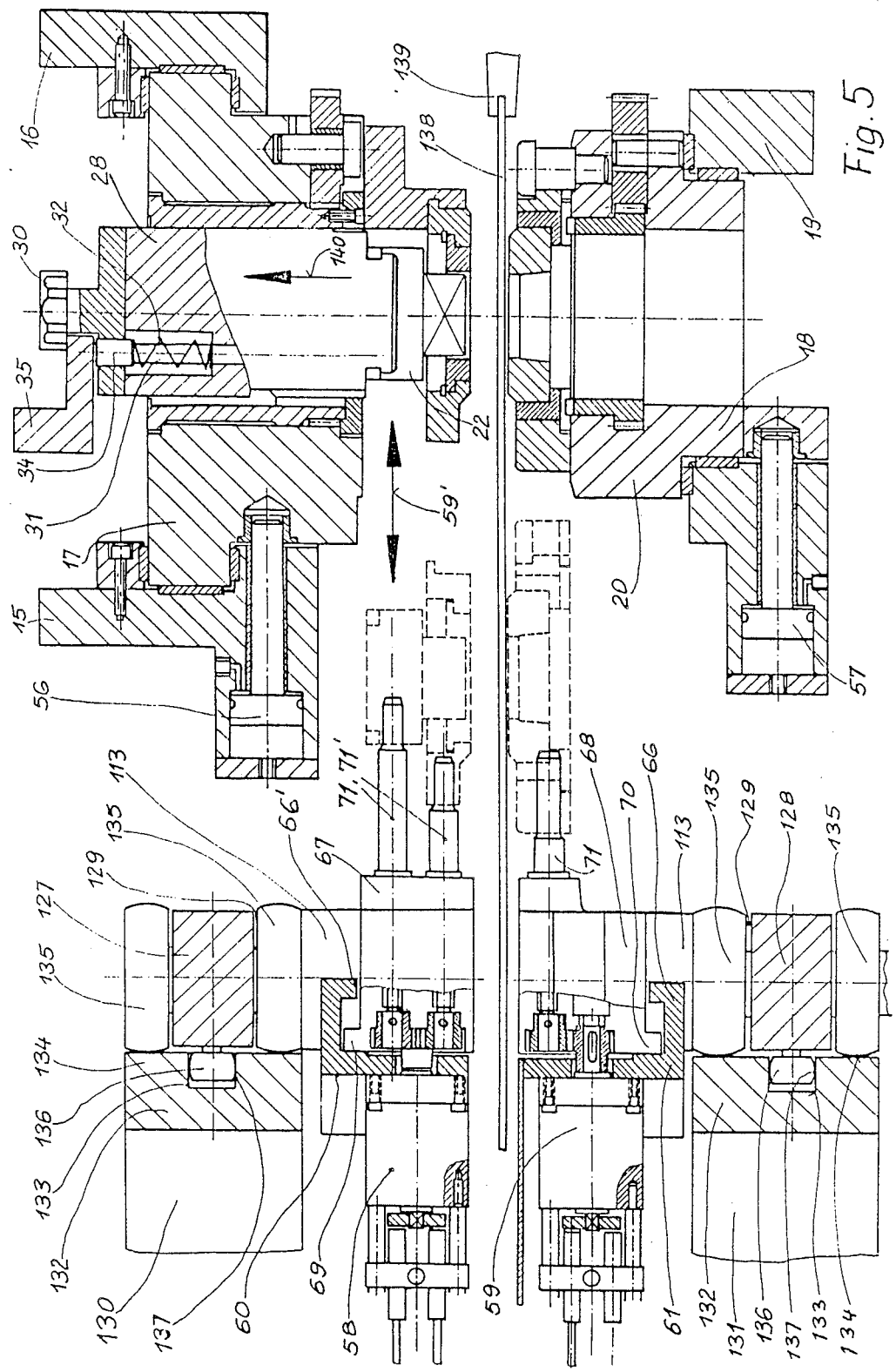
FIG. 5 is a view substantially corresponding to the view of FIG. 2, and showing the cooperation of the structural elements during the tool exchange in the sheet working machine of the invention.

FIG. 5 shows the guide of the upper and lower chain trains 127 and 128 of the chain magazine 9. Each chain member 113 is in firm connection with a chassis 129 whereas the upper chain train 127 is associated with an upper guiding structure 130 and the lower chain train 128 is associated with the lower guiding structure 131. Each guiding structure 130 and 131 includes a guiding rail 132 which is mounted on the base body 2 and provided with a groove 133 at its end facing toward the chassis 129. The groove which has an approximately rectangular cross-section is located on an approximately vertically extending surface 134. Rollers of the chassis 129 are identified with reference numeral 135 and roll on the surface 134 to perform a horizontal guiding function. Rollers 136 roll on a substantially horizontal extending side surface 137 of the groove 133 to perform a vertical guiding function. Reference numeral 138 identifies a sheet which is held or positioned relative to the tool with a clamp 139 of the coordinate table for mechanical working.

FIG. 5 shows the tool exchange devices 58 and 59 in their entirety, and in particular in their lateral arrangement relative to the punching blocks 17 and 20 which are displaceable perpendicularly to the plane of the drawing of FIG. 5. The upper tool exchange device 58 is formed similarly to the lower tool exchange device 59. The pins 71 and 71' are associated in a pair with the upper tool support. The pin 71 is non-rotatable about its longitudinal axis, while the pin 71' is rotatable about its longitudinal axis on the respective tool support 67, 68. The drive of the rotatable pin 71' is performed identically to that of the lower tool support 68 so that a repeated description thereof is omitted. The design of the end region of the pin 71' and thereby its function relative to the tool to be handled is identical as compared with the lower tool supports. The non-rotatable pin 71 performs exclusively a supporting function while the rotatable pin 71' performs an arresting function in addition to the supporting function.

Since in the punching station 4 an arresting of the punch 22 is performed by means of the arresting pin 31 whose head part 34 is held down in the punching station through the adapter 73 against the force of the spring 32, while to the contrary, this position of the arresting pin is taken over outside of the punching station 4 partially by the punch holding strip 35, a solution of this arresting thereby permits that in the positions associated with a tool exchange along the guiding rails 15 and 16 the punch holding strip 35 ends, so that under the action of the spring 32 the arresting pin 31 is lifted in direction of the arrow 140 upwardly so far that the arresting is released and now a withdrawal of the punch 22 from the punch holder 28 in horizontal direction, namely in direction of the arrow 59' is possible.

The handling of the tools within the frame of the station 12, particularly the insertion of complete tool sets in the chain magazine 9 performed there, namely in respective upper and lower chain trains 127 and 128, or the withdrawal of the tool sets, is performed in identical manner as the tool exchange in the region of the punching station 4. Therefore the description of this process is omitted.

Figure 6:
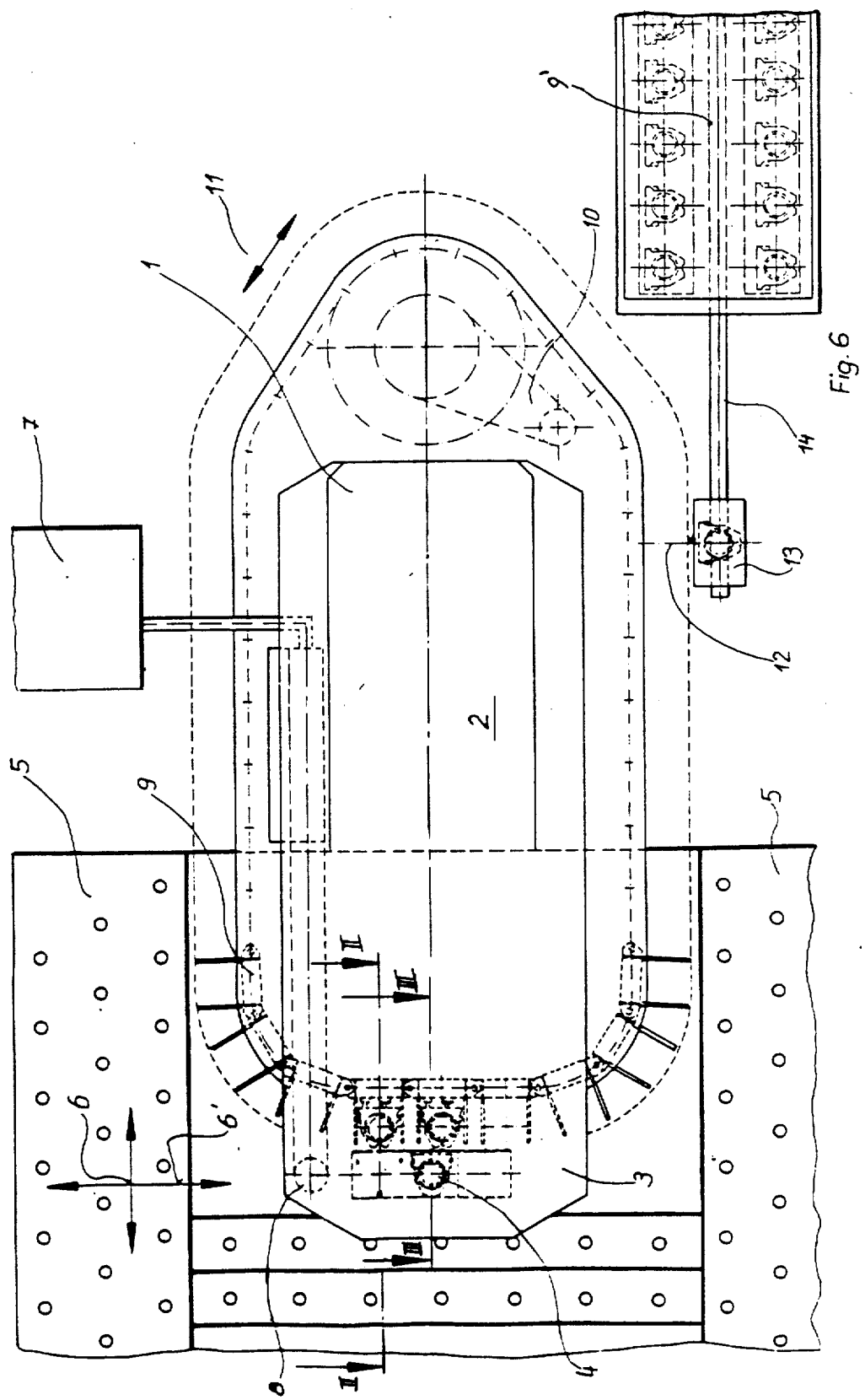
FIG. 6 is a view substantially corresponding to the view of the FIG. 1 but showing the sheet working machine with two tool magazines.

FIG. 6 shows the sheet working machine with an additional tool magazine or tool support which is connected via the guiding rail 14 with the station 12 arranged in the region of the guidance of the chain magazine 9. By the transporting wagon 13 which is movable along the guiding rail 14 the complete tool sets can be withdrawn from the chain magazine 9 and transferred into the tool magazine or support 9', or withdrawn from the tool support 9' and inserted into the chain magazine 9.

The operation of the inventive sheet working machine is shortly described hereinbelow.

The operation starts in that both tool receiving systems of the punching blocks 17 and 20 are equipped with respective complete tool sets. One tool set is provided with a punch 22, a stripper 21 with a stripper ring 25, and a die shoe 23 with a receiving ring 45 as well as matrix 24. For exchange of the tool set located in the punching station 4 in working condition with the other tool set located in the punching blocks 17 and 20, the punching blocks 17 and 20 are displaced to the right from the position shown in FIG. 4 by actuation of the cylinder-piston units, having a cylinder 118 and a piston with a piston rod 119 whereby the tool set located in the left tool receiving system reaches the punching station 4 and therefore the working condition. During the work program running with the tool set located in the punching station 4, the other tool system which is held in the punching blocks 17 and 20 is exchanged in that first the upper and lower chain magazines 9 are moved relative to the punching station to be located opposite an emptying system of respective upper tool supports 67 and lower tool supports 68 of the right tool exchange devices shown in FIG. 4. By actuation of the cylinder-piston unit 105, the plates 60 and 61 are moved in direction to the tool supports 67 and 68, whereby simultaneously an engagement between the pinion 64 of the rotary cylinder-piston unit 109 and the toothed wheel 112 of the pins 71' is established. Then the tool set which is located in the punching blocks is engaged by further displacement of the plates 60 and 61 and actuation of the rotary cylinder-piston unit 109, and by subsequent actuation of the cylinder-piston units 105 withdrawn from the punching blocks 17 and 20 in direction of the arrow 59'. The withdrawn tool set is transferred to the chain magazine 9. After a release of the form-locking engagement between the pinion 64 and the toothed wheel 112 by further reverse movement of the plates 60 and 61, the chain magazine 9 is moved by means of the drive system 10 and a further tool set corresponding to the running working program is moved to a position opposite to the last mentioned tool exchange devices. The previously provided form-locking engagement between the cams 69 and 70 as well the driving parts 65 and 66 is released by displacement of the chain magazine 9, since this form-lock is effective in the displacement direction of the tool supports 67 and 68. Then by actuation of the tool exchange devices 58 and 59 in the above described manner, a new tool set is transferred into the empty receiving system of the punching blocks 17 and 20.

The next tool exchange of tool set located in the punching station 4 can be performed by mere displacement of the punching blocks 17 and 20. The tool set withdrawn from the punching station 4 is now arranged opposite to the tool exchange arrangement as shown in FIG. 4 and is available for an exchange in the above described manner.

The tool stock contained in the chain magazine 9 can be adapted to the respective program via the station 12 and the transporting carriage 13 in connection with a further not shown tool support. It can be seen that the tool exchange in the punching station is performed by more displacement of the punching blocks 17 and 20 in shortest time, and a very extensive tool reservoir is available for the mechanical working. In connection with the transporting carriage 13 as well as an outer tool support, this tool reservoir can be made of any volume. It is also understood that the space consumption as well as the standing surface of the inventive sheet working machine is increased only insignificantly despite the system of the chain magazine 9, since the chain-like construction of this tool system directly associated with the sheet working machine provides for any spatial adaptation of its construction.

It will be understood that each of the elements described above, or two or more together, may also find a useful application in other types of constructions differing from the types described above.

While the invention has been illustrated and described as embodied in a sheet working machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sheet working machine, comprising
   a working station including a tool for working a plate-like workpiece, and drive means for driving said tool;
   a chain-like tool magazine displaceable in a horizontal plane and guided, at least in a region of said working station, at a height corresponding to a height of the working station, and carrying a plurality of tools; and
   at least one stationary tool exchange device for transferring tools from said tool magazine to said working station;
   said tool magazine including a plurality of articulated connected with each other chain links, a plurality of tool supports associated with said plurality of chain links, respectively, with each tool support being displaceable relative to an associated chain link and having handling means for engaging at least one tool, and arresting means for locking said tool magazine in a predetermined position;
   said stationary tool exchange device including a displacement drive connectable with said tool supports due to movement of said tool magazine along a displacement path thereof for linearly displacing said tool supports, and a rotary drive providing for a locking function of said handling means;
   said working station further including at least one linearly displaceable carriage, at least two tool receiving systems associated with said linearly displaceable carriage, and tool driving means, said two tool receiving systems being selectively connectable with said tool driving means for driving the tools, with a tool receiving system which is not connected with said tool driving system, being connectable with said stationary tool exchange device for effecting tool exchange;
   said tool magazine being displaceable, in a region of said working station or said tool exchange device, parallel to said carriage with said carriage being arrested in a position in which at least one tool receiving system associated therewith is located opposite said stationary tool exchange device to provide for transferring of a tool supported on a tool support of a chain link of said tool magazine into said one tool receiving system by linear displacement of said tool support which takes place due to actuation of said stationary tool exchange device.

2. A sheet working machine defined in claim 1, further comprising means for arresting said carriage in a predetermined position for locating a tool in a transferable position thereof.

3. A sheet working machine defined in claim 2, further comprising motor means for at least partial actuation of said arresting means.

4. A sheet working machine defined in claim 1, comprising a base body, the displacement path of said tool magazine substantially corresponding to a contour of said base body.

5. A sheet working machine defined in claim 1, wherein said handling means comprises two pins associated with a tool, one of said two pins being rotatable and another of said two pins being non-rotatably supported on the tool support, said rotatable pin being connected with said rotary drive of said tool exchange device, the tool having two openings for receiving said two pins and an element for arresting said rotatable pin to prevent an unintentional withdrawal thereof.

6. A sheet working machine defined in claim 2, further comprising guide rail means along which said carriage is displaced, said arresting means being actuated in response to displacement of said carriage along said guide rail means.

7. A sheet working machine defined in claim 1, wherein the tool comprises upper and lower tools, said tool receiving system comprising spaced upper and lower tool receiving systems arranged on said carriage independently of each other, said tool exchange device including upper and lower tool exchange means, said chain-like magazine comprising upper and lower chain trains displaceable along the displacement path of said magazine independently of each other, said tool supports being displaceable on chain links of said upper and lower trains in direction towards to and away from said working station.

8. A sheet working machine defined in claim 7, further comprising drive means for rotating a tool about a longitudinal axis of the tool when the tool is coupled with said tool driving system.

9. Sheet working machine defined in claim 1, wherein said carriage has a T-shaped cross-section, said machine comprising guide rail means and sliding bearing means for supporting said T-shaped carriage on said guide rail means.

10. A sheet working machine defined in claim 7, wherein the upper tool comprises a stripper and a punch and the lower tool comprises a die shoe and a die, said machine further comprising first means for rotating said punch about a longitudinal axis thereof and including a punch holder and a first bushing surrounding said punch holder and rotatably supported in said carriage, second means for rotating said die and including a ring for receiving said die and rotatably supported in said die shoe, said receiving ring being connected at an end side thereof with a second bushing rotatably supported in said carriage, and independent drive systems for driving said first and second rotating means, said drive systems comprising two motor means pivotably supported on a base body of said machine, said first and second bushings having outer toothing engageable with said two motor means, respectively.

11. A sheet working machine defined in claim 1, further comprising a tool transporting carriage; a station at which the tools are transferred between said tool magazine and said tool transporting carriage; and tool reservoir, said tool transporting carriage being movable between said tool reservoir and said station and having means for automatic tool take-over, said station having tool handling means substantially similar to said tool exchange device.

12. A sheet working machine defined in claim 7, wherein each of said tool receiving systems has a drive system associated with means for rotating a respective tool about a longitudinal axis thereof.

13. A sheet working machine defined in claim 5, wherein said tool is a punching tool comprising upper and lower tools, said tool receiving systems comprising spaced upper and lower tool receiving systems.

14. A sheet working machine defined in claim 13, wherein said upper and lower tool receiving systems are arranged independently of each other, said working station further including tool handling means comprising upper and lower tool exchange devices, said tool magazine comprising upper and lower chain trains displaceable along the displacement path of said magazine independently of each other, said tool supports being displaceable on chain links of said upper and lower trains in directions towards to and away from said working station.

15. A sheet working machine defined in claim 5, further comprising drive means for rotating a tool about a longitudinal axis of the tool when the tool is coupled with said tool driving system, and a base body, said tool driving system being supported on said base body.

16. A sheet working machine defined in claim 13, wherein the upper tool comprises a stripper and a punch and the lower tool comprises a die shoe and a die, said machine further comprising first means for rotating said punch about a longitudinal axis thereof and including a punch holder and a first bushing surrounding said punch holder and rotatably supported in said carriage, second means for rotating said die and including a ring for receiving said die and rotatably supported in said die shoe, said receiving ring being connected at an end side thereof with a second bushing rotatably supported in said carriage, and independent drive systems for driving said first and second rotating means.

17. A sheet working machine defined in claim 16, wherein said drive systems comprising two motor means pivotably supported on a base body of said machine, said first and second bushings having outer toothing engageable with said two motor means, respectively.

18. A sheet working machine defined in claim 1, wherein said tool driving means comprises two tool driving systems mounted on said carriage, each of said two tool receiving systems being connected with a respective one of said tool driving systems.

19. A sheet working machine defined in claim 1, wherein an axis of the tool arranged at said working station extends parallel to axes of tools carried by said chain-like tool magazine.

* * * * *

UNITED STATES PATENT AND TRADEMARK OFFICE
CERTIFICATE OF CORRECTION

PATENT NO. : 4,985,983

DATED : January 22, 1991

INVENTOR(S) : Otto et al

Page 1 of 2

It is certified that error appears in the above-identified patent and that said Letters Patent is hereby corrected as shown below:

The sheet of Drawing consisting of Fig. 6 should be added as per attached page.

Signed and Sealed this

Third Day of March, 1992

Attest:

HARRY F. MANBECK, JR.

Attesting Officer

Commissioner of Patents and Trademarks